(12) United States Patent
Hazel (10) Patent No.: US 8,408,465 B2
(45) Date of Patent: Apr. 2, 2013

(54) PORTABLE OPTICAL CARD READERS

(75) Inventor: Robert L. Hazel, Foster City, CA (US)

(73) Assignee: Lasercard Corporation, Mountain View, CA (US)

( * ) Notice: Subject to any disclaimer, the term of this patent is extended or adjusted under 35 U.S.C. 154(b) by 0 days.

(21) Appl. No.: 13/224,580

(22) Filed: Sep. 2, 2011

(65) Prior Publication Data

US 2011/0315769 A1 Dec. 29, 2011

Related U.S. Application Data

(62) Division of application No. 11/830,491, filed on Jul. 30, 2007, now Pat. No. 8,033,467.

(51) Int. Cl.
G06K 7/10 (2006.01)

(52) U.S. Cl. ....................................................... 235/454

(58) Field of Classification Search .................. 235/436, 235/454, 472.01, 486, 492
See application file for complete search history.

(56) References Cited

U.S. PATENT DOCUMENTS

| | | | |
|---|---|---|---|
| 4,114,045 A | 9/1978 | Shiina | |
| 4,864,630 A | 9/1989 | Arnold et al. | |
| 5,008,552 A * | 4/1991 | Kuramochi et al. | 235/483 |
| 5,029,125 A | 7/1991 | Sciupac | |
| 5,105,072 A | 4/1992 | Saito et al. | |
| 5,332,890 A | 7/1994 | Kitahara | |
| 5,436,438 A * | 7/1995 | Shikichi | 235/454 |
| 5,511,051 A * | 4/1996 | Rokutan et al. | 369/44.28 |
| 5,869,163 A | 2/1999 | Smith et al. | |
| 6,550,676 B2 | 4/2003 | Haddock | |
| 6,741,529 B1 | 5/2004 | Getreuer | |
| 6,840,446 B2 | 1/2005 | Kawan | |
| 8,033,467 B2 | 10/2011 | Hazel | |
| 2005/0247776 A1 | 11/2005 | Harper et al. | |
| 2007/0051003 A1 | 3/2007 | Bennison et al. | |

OTHER PUBLICATIONS

Website printouts: LaserCard Corporation, ISO Documents 11693 et al., 2005, 6 pages.
Official Action for U.S. Appl. No. 11/830,491, dated Oct. 27, 2010 7 pages.
Official Action for U.S. Appl. No. 11/830,491, dated Mar. 30, 2011 7 pages.
Notice of Allowance for U.S. Appl. No. 11/830,491, dated Jun. 27, 2011 9 pages.

\* cited by examiner

Primary Examiner — Seung Lee
(74) Attorney, Agent, or Firm — Sheridan Ross P.C.

(57) ABSTRACT

A device for reading optical data cards. This device includes a shuttle mounted on shuttle tracks within the device housing. The shuttle is configured to move back and forth on the shuttle tracks driven by the shuttle motor. A card loader allows optical data cards to be positioned onto the shuttle. A CD optical read head mounted on optical read head tracks and driven by a optical head motor reads modified to read a single track of optical card data reads the optical card. A controller receives data from the read head and controls the movement of the shuttle and the optical head.

10 Claims, 13 Drawing Sheets

PORTABLE OPTICAL CARD READERS

CROSS REFERENCE TO RELATED APPLICATIONS

The present application is a divisional of U.S. patent application Ser. No. 11/830,491, filed Jul. 30, 2007, the entire disclosure of which is hereby incorporated herein by reference.

TECHNICAL FIELD

The present device relates to optical readers and more specifically optical card readers.

BACKGROUND ART

Optical memory cards are used throughout the world as secure identification cards. These cards generally contain both human readable and machine readable information. For some optical memory cards, the machine readable data is in the form of optically preformatted and recorded digitally encoded information as described in ISO documents 11693 et al. This digital information may be updated by a user under some conditions.

In optical data storage, spots or other marks (which may be micron scale but generally are ~2.5 micron in scale) are marked onto the surface of an optical data storage medium. This data may then be read by an optical reader. Such a reader may use an area array detector (e.g. a CCD array), a photo diode detector or other detector to image illuminated optical data. The data spots may be illuminated using a laser, an LED, or other illuminating source that provides a uniform illumination of sufficient intensity. In such readers, the light beam or the optical media are moving to scan a track of the data.

The use of a data card for storage of optical media provides a convenient device for holding a substantial amount of data. This technology allows greater than 2000 pages of data to be arranged in rows and columns on an optically readable surface the size of a credit card. One such producer of both the optical cards and optical card drives to record and read back the digital data is Lasercard Corporation (Mountain View, Calif.), the pre-eminent producer of optical cards that store more than 1 megabyte of data. These cards are described in U.S. Pat. Nos. 4,864,630; 5,029,125 and others. On these cards, data is stored in tracks running the length of the card. Such tracks can occupy up to 35 mm of the width of the card.

The presently available readers include the LaserCard 600-Q Optical Card Drive (LaserCard Corp., Mountain View, Calif.). This reader provides secure and automatic card authentication, an automatic card intake and ejection mechanism for reliable operation, auto-locking optical head for secure transportation, and rapid transactions for convenience, high service levels, and efficiency. Different embodiments of this system may include contact and contactless IC Chip reader, write capability disabling (i.e., read-only mode), and customized firmware for a secure encoding and reading applications.

The 600-Q Optical Card Drive is a robust read/write unit. The drive is a stand-alone SCSI II/USB peripheral, supplied with drivers and DLLs for rapid integration into standard PC environments. It can also be physically integrated into terminal and kiosk environments, providing even greater application flexibility.

In some applications the user may want to read optical cards at remote locations. This would require a portable optical card reader. One object is to provide a portable device to read digital information preformatted and recorded onto optical memory cards. An additional object is to provide a reader that can be used in portable applications and operate under battery power. Such a device also should be low weight and comfortable to hold. It is a further object to provide rapid reading, providing fast random access to individual tracks over the entire recordable area on a card. It is further object to provide rapid loading and extraction of the card from the reader.

A further object is to develop a reader that is adaptable to low cost, high volume manufacturing and uses low cost components. Any optical reader requires a complete optical system for the illumination and detection of spots on an optically scanned surface. Such optical assemblies (e.g. optical read heads) are inexpensive only if manufactured in very high volume. In the present device, the reader will not be manufactured in sufficient volume to allow a cost effective custom optical head. It is an object of the invention to adapt an existing optical component to allow low power consumption and rapid reading of optical card data.

SUMMARY

The above objects are achieved with a portable device for reading optical data cards having improved motion between optical and recording media components. This device may include a shuttle mounted on shuttle tracks within the device housing. The shuttle may move back and forth on the shuttle tracks driven by the shuttle motor. A card loader allows optical data cards to be positioned onto the shuttle. A CD optical read head mounted on optical read head tracks and driven by an optical head motor modified to read a single track of optical card data reads the optical card. A controller receives data from the read head and controls the movement of the shuttle and the optical head.

In some embodiments, the shuttle motor and the motor driving the card loader are battery powered DC motors. The optical head motor may be a stepper motor driving a lead screw that is linked to the CD optical read head. The device may include an optical scale, such as a transmissive Mylar scale, on the shuttle that is read by a scale sensor mounted to the housing. This device may allow determination by the controller of the velocity and position of the shuttle and thus the card on the shuttle. The shuttle may include a spring clamp, which holds the card flat onto the shuttle in a registered position. The system may also include a shuttle lock driven by a solenoid. The controller may be a number of simultaneously running state machines.

DETAILED DESCRIPTION

Figures 1A, 1B:
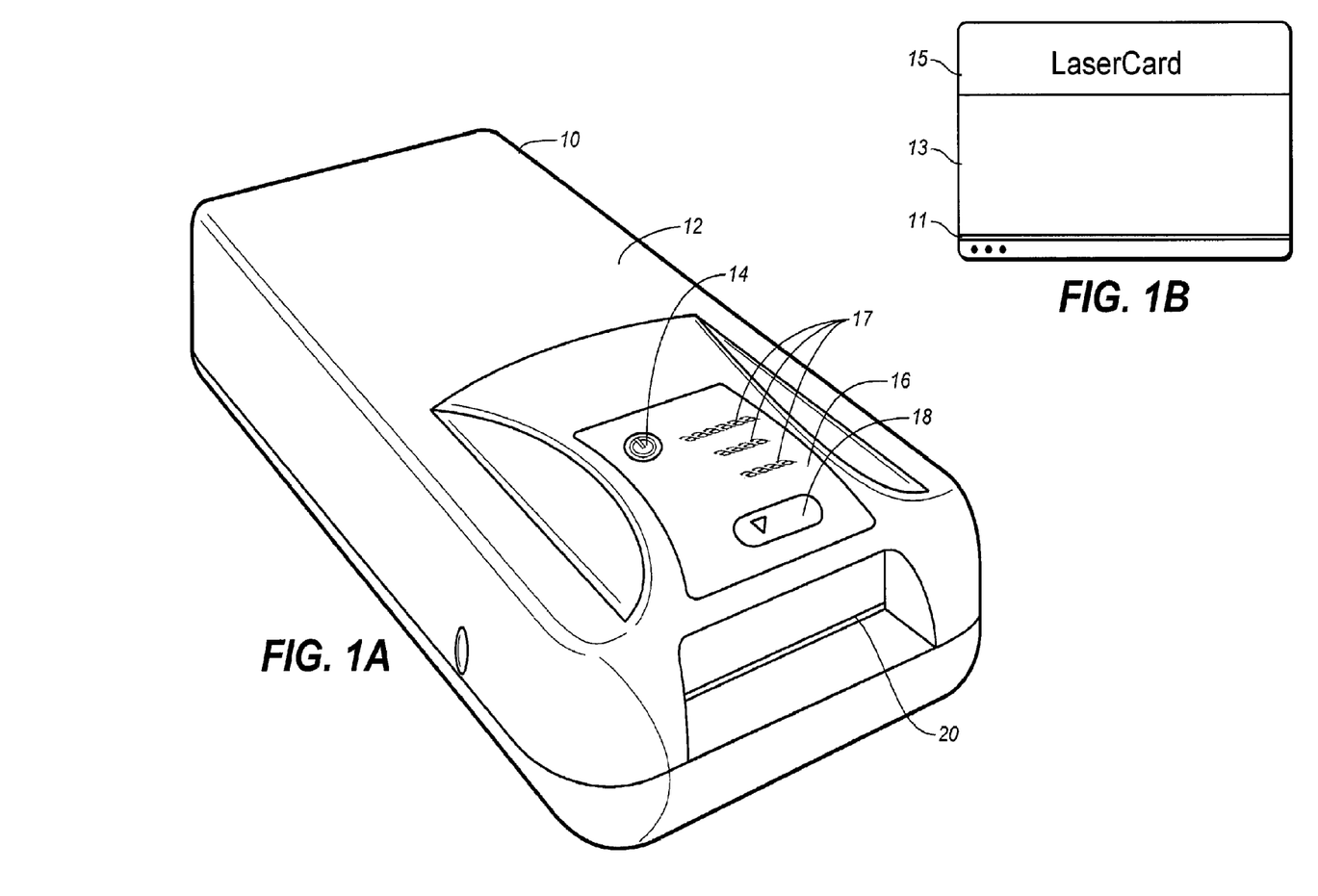
FIG. 1A is a top perspective view of an optical reader.
FIG. 1B is a top perspective view of an optical card.

With reference to FIG. 1A, optical card reader includes an outer housing 12 having a battery door pin at the rear. Alternatively or in addition, the unit could be powered by a power cord or an external battery pack. A control panel 16 includes an on switch 14 and an eject button 18. The illustrated embodiment allows the optical card to be ejected through card slot 20 at the front of the device. Display light 17 allow display of the system status. The card slot 20 is at the front of the reader and the I/O connectors and optional power input ports are at the back of the reader and not visible in this view. The housing encloses the internal components, preventing stray external light from being detected.

View 1B shows a typical optical card. The illustrated card is a 2.8 megabyte LaserCard® (LaserCard Systems, Corp., Mountain View, Calif.). This device includes human readable media 15 and optical media 13. Optical media 15 allows storage of 2.8 megabytes of information. These presently available cards are used in this new device.

Figure 2:
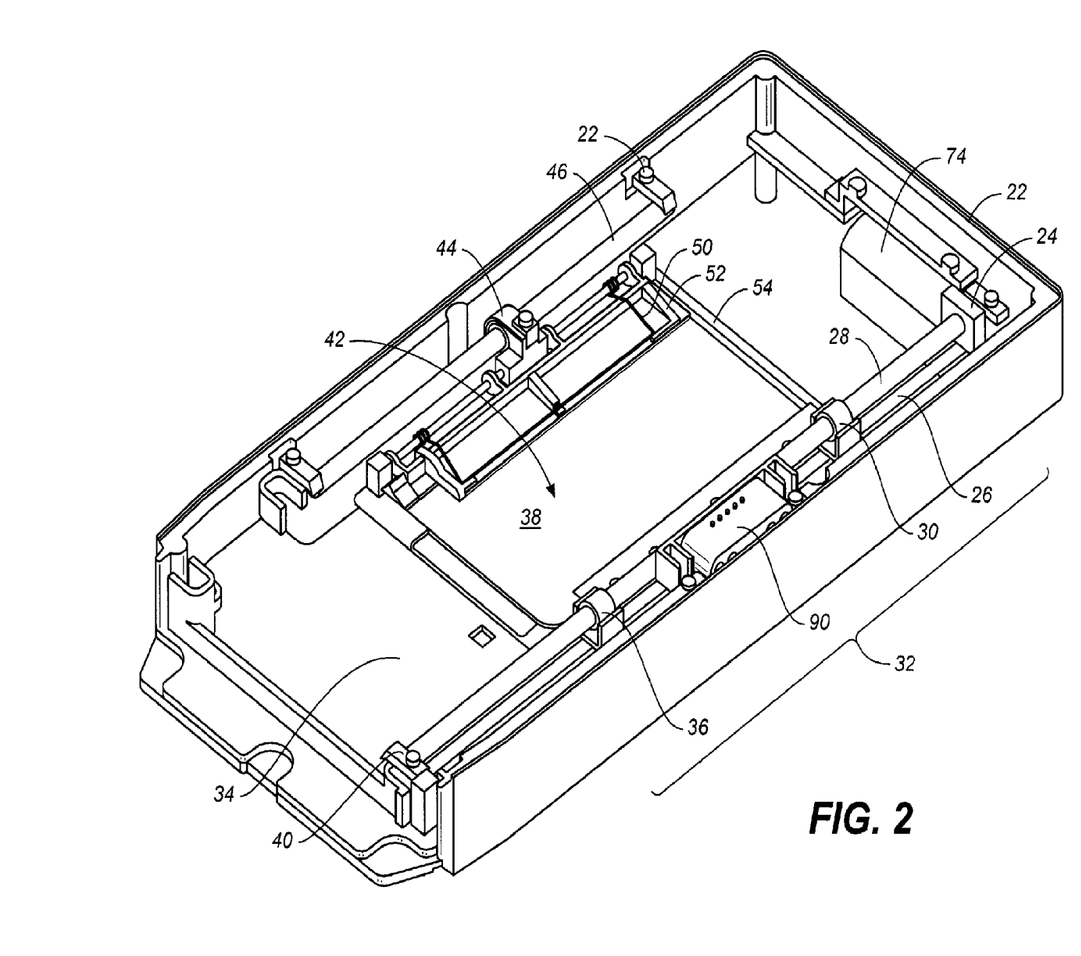
FIG. 2 is a top perspective view of the reader card shuttle mounted on tracks held within the optical reader frame.

With reference to FIG. 2, the frame 22 holds a first shuttle track 28. Mounted on the first shuttle track 28 are runners 30, 36. Runners 30, 36 are mounted on card shuttle 54. The sweep range of the runners 30, 36 is limited by stops 40, 24. The illustrated configuration provides a system in which card 38 mounted on shuttle 54 may be scanned with a sweep length 32. Sweep link 32 is sufficiently long that the entire optically readable media on optical card 38 may be read by an optical head that views through an aperture 42 in shuttle 54. The housing 22 also defines a card loading dock area 34. In this dock 34 the optical card 38 is loaded onto shuttle 54.

On the opposite side of frame 22 a second shuttle track 46 is mounted. Runner 44 on shuttle 54 allows the shuttle to move back and forth on track 46.

Figure 5:
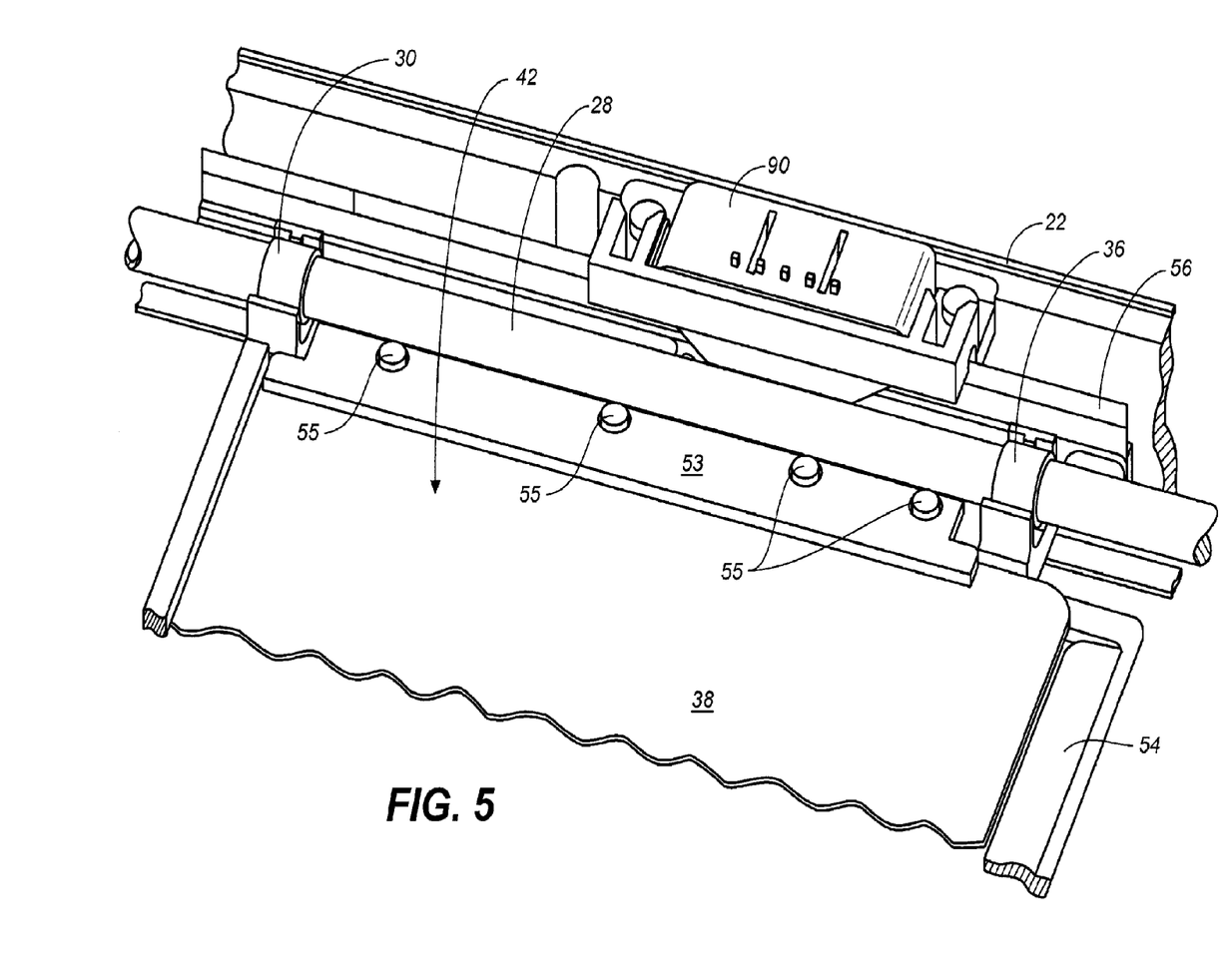
FIG. 5 is a detail of FIG. 1, showing the position sensor.

Shuttle 54 holds card 38 on peripheral edges allowing reading of the central area of card 54 from the bottom through aperture 42 where the optically readable media is positioned. A clamp 52 biased by spring 50 on shuttle 54 retains card 38 in position on shuttle 54. The shape of the card retaining structures on shuttle 54 combined with the force exerted by clamp 52 ensures that the optical card 38 is both held in a defined position on shuttle 54 and is sufficiently flat on the shuttle that the optical media can be read. Card 38 is inserted below guide 53 secured with screws 55 (as shown in FIG. 5) on one side of shuttle 54 opposite clamp 52. An optical scale (shown in FIG. 5) may be detected by a position sensor 90 mounted on housing 22. This will be subsequently described further in conjunction with FIG. 5.

Mounted on housing 22 is shuttle motor 74. Shuttle motor 74 drives belt 26. The shuttle 54 is mechanically linked to belt 26. This belt reciprocally drives the shuttle on a path having a range limited by stop 24 and stop 40. The shuttle range is divided into two lengths; a card sweep length where the card is moved back and forth allowing an optical reader to read a track of data, and the card load length where the card loader may move the card onto and off of the shuttle.

The shuttle clamp 52 and associated spring 50 both locate the card in the proper position on the shuttle and ensure that the card is sufficiently optically level over aperture 42 in the shuttle. This permits the card to be read from below.

Figure 3:
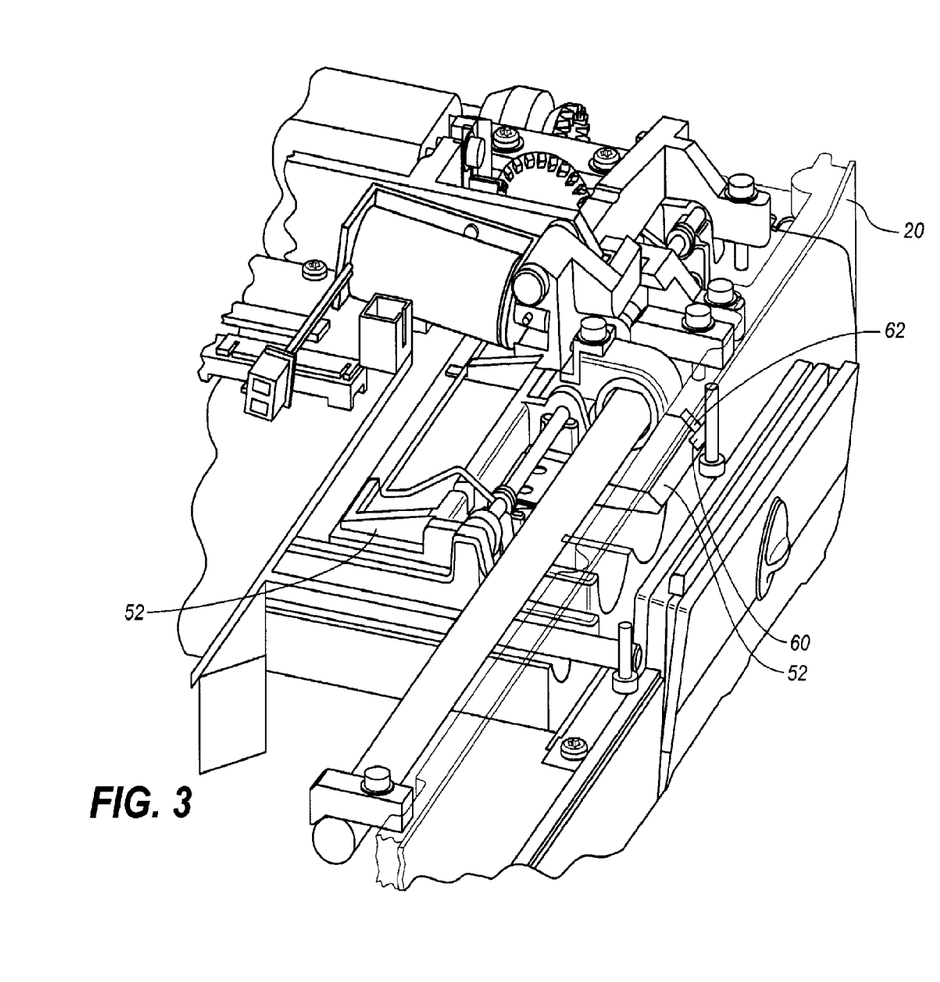
FIG. 3 is a top perspective detail of the shuttle card clamp lifting mechanism.

With reference to FIG. 3, the mechanism for ejecting the card is shown. This occurs when the shuttle 54 holding optical card 38 held by clamp 52 reaches the loading dock area (shown as location 34 in FIG. 2). At this point, the lower part of the clamp 52 makes contact with the roller bearing 60 and pivots around the clamp spring shaft. The upper part of the clamp 52 is then raised and frees the card for ejection. The roller bearing 60 is attached to a shaft 62 held on frame 20. This mechanism is designed to maximize the allowable clamp force to retain the optical card 38 on shuttle 54 while at the same time allowing a low current motor (such as the motor 74 shown in FIG. 2) to be used to move the shuttle to and from the load position.

Figure 4:
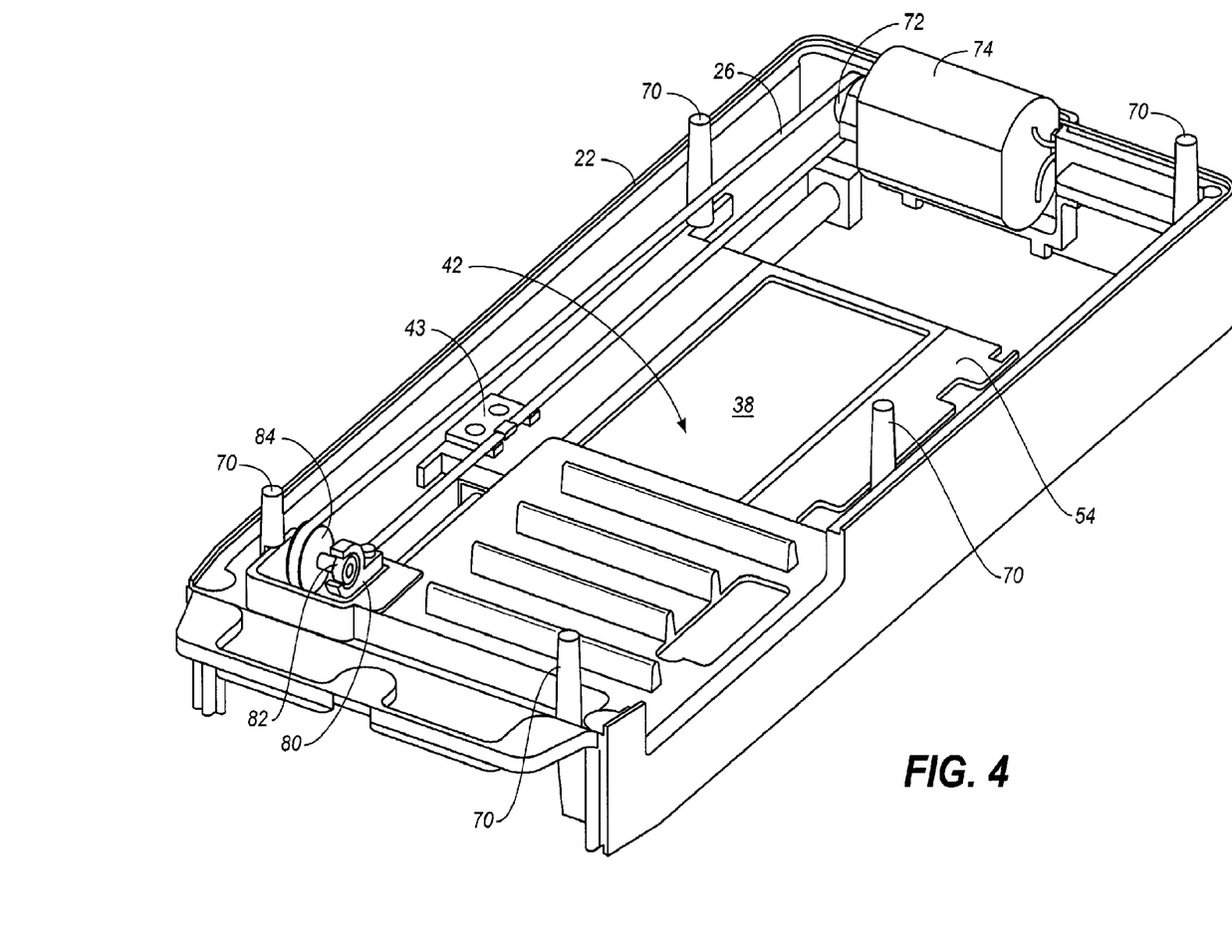
FIG. 4 is a bottom perspective view of the reader showing the shuttle drive belt.

With reference to FIG. 4 the view from below illustrates the drive mechanism used to move shuttle 54. Frame 22 is shown having a plurality of legs 70 to support the reader on a surface. Not shown in this view is a bottom plate which would be secured of the bottom to enclose the working mechanisms of the device. Shuttle 54 is shown having an aperture 42 through which optical card 38 may be viewed. This allows scanning from the bottom.

Motor 74 drives pulley 72 which translates drive belt 26. This drive belt 26 is a drive mechanism which is mechanically linked by link 43 to shuttle 54 allowing the shuttle to be driven along the two tracks shown in FIG. 2. Opposite drive shaft 72 is an idler pulley 84 held on bearing 82 which in turn is secured to mount 80. Mount 80 is secured to housing 22 such that it forms a secure attachment location allowing idler pulley 84 to freely rotate when drive shaft 72 is rotated.

With reference to FIG. 5, the detail of the position sensor is shown. Shuttle 54 as previously illustrated in FIG. 2 includes runners 30, 36 which are slidably mounted on shuttle track 28. An optically readable scale 56 is also mounted on shuttle 54. The optically readable scale 56 consists of opaque markings on a transmissive substrate such as glass, Mylar or other dimensionally stable transparent materials. As the shuttle moves back and forth on the shuttle track 28, the optical scale passes through an optical scale sensor 90 attached to frame 22. The sensor 90 outputs provide high resolution shuttle position, velocity and direction information. This information is inputted to a shuttle position controller and read by the read data decoder. These features will be discussed further in relation FIGS. 10 and 11. These elements are not shown in the present FIG. 5.

The read data decoder utilizes the position, velocity, and direction information to eliminate the need for precise speed control during optical card read sweeps. This also permits the decoder to recover from major defects in the media of optical card 38.

Figure 6:
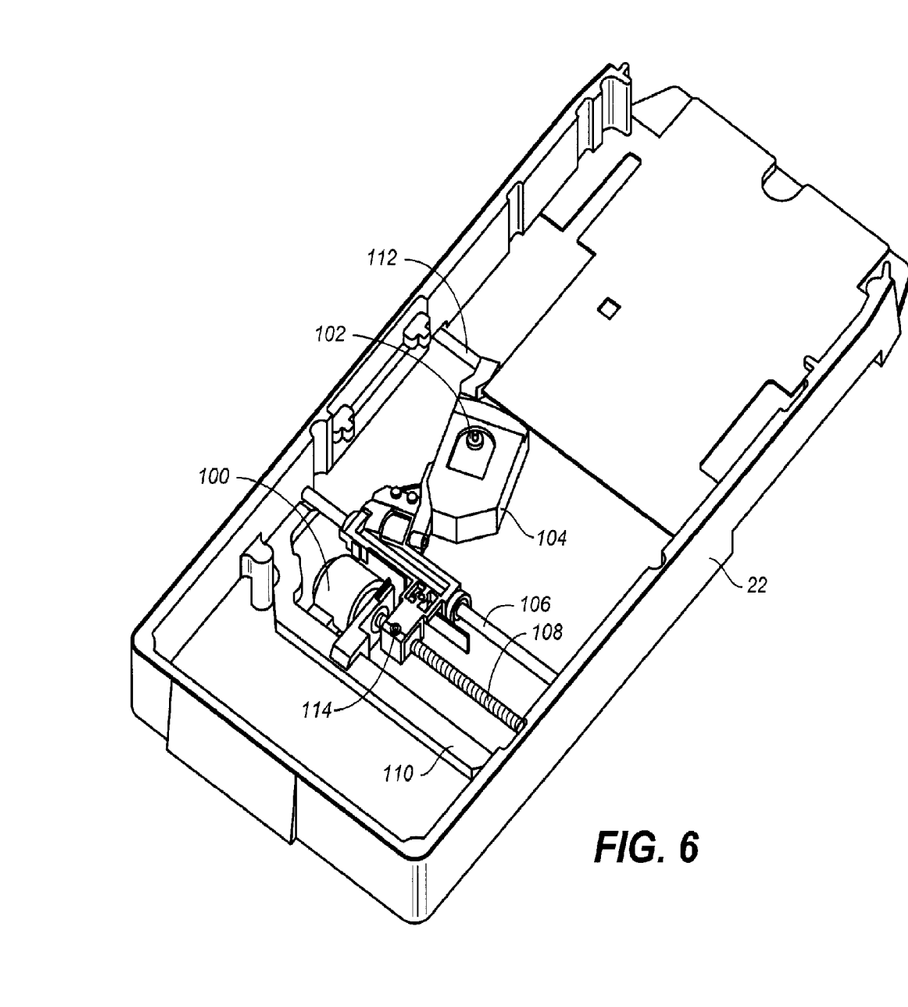
FIG. 6 is a top perspective view showing the optical read head linked to a stepper motor/leadscrew actuator.

With reference to FIG. 6, the optical head of the illustrated embodiment and associated drive elements are illustrated.

In FIG. 6, a motor 100 is secured on motor mount 110 which in turn is secured on frame 22. Motor 100 drives screw 108. The rotation of screw 108 moves half nut 114 which is mechanically linked to CD read head 104. On the opposite side of CD read head 104, the read head is mounted on track 112 which is also secured to frame 22. This configuration allows the read head to be accurately positioned by turning screw 108 and moving CD read head 104 on tracks 106, 112.

The CD read head 104 is mounted to the tracks in a unique manner. This optical head is mounted at a different angle with respect to the tracking action than the angle generally used in a CD reader. This is done to allow a tracking signal to be derived from the beams produced by the read head 104. The angle depends on the spacing of the tracking beams produced by read head 104.

A CD optical head is designed to read through the transparent substrate of a compact disk. The CD read head has an objective lens designed to correct for aberrations produced during reading of the CD optical media. This correction is optimized for one particular substrate thickness. In contrast the optical media on an optical card has a transparent overcoat that the beams must pass through. However, this material is much thinner than the transparent material on an optical disk. This results in a significant spherical aberration of the focused illumination beam spot on the data card layer and an attendant distortion of the playback signal (detected reflective spots). This distortion is reduced to an acceptable level by pad printing an angular ring 102 on the exposed surface of the objective lens of CD reader 104. This effectively reduces the numerical aperture of the lens. The numerical aperture used is 0.32.

Figure 7A:
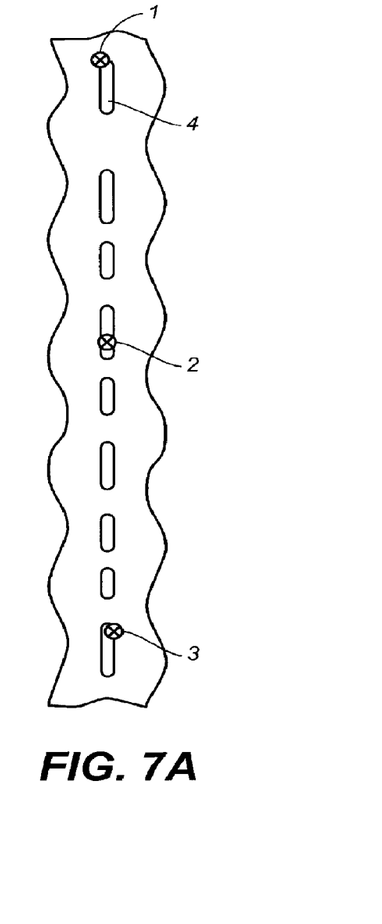
FIG. 7A is an illustration of three beam tracking of optical disc data.
Figure 7B:
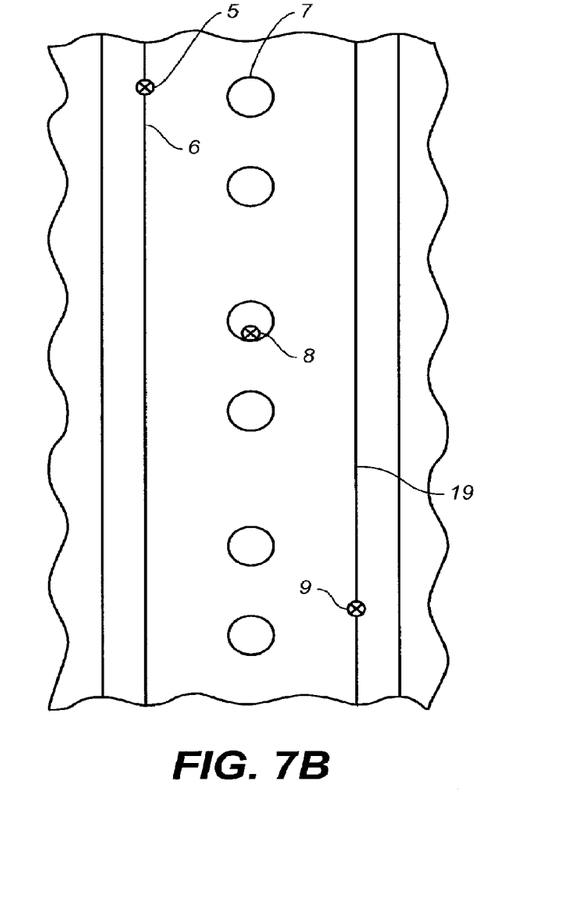
FIG. 7B is a illustration of three beam position for reading optical cards.

With respect to FIG. 7A, the 3-beam output of a CD head on a CD track is illustrated. Beam spots 1, 2, and 3 are tracked onto a single line of optically detectable spots. In FIG. 7B, the tracking of the beam spots is altered. Beam spot 5 is directed to target optical track guide 6. Likewise beam spot 9 is targeted to optical track guide 19. A single beam spot 8 targets the recorded data pits 7. In this manner the system includes a more precise targeting of the data tracks.

The optical read head 104 provides both the illumination of the optical media as well as collection of reflective light. This collected reflected light is detected by a detector within CD reader 104. The objective lens acts to both to focus the beam spots onto the optical media and collect within a design numerical aperture light reflected from the optical media. This is detected by a detector within the read head.

A spring loaded half nut (see FIG. 6) links the movable porting of the CD read head assembly with the stepper motor lead screw 108. This reduces the screw-motor alignment and screw straightness requirements. This addition eliminates one source of backlash.

Figure 8:
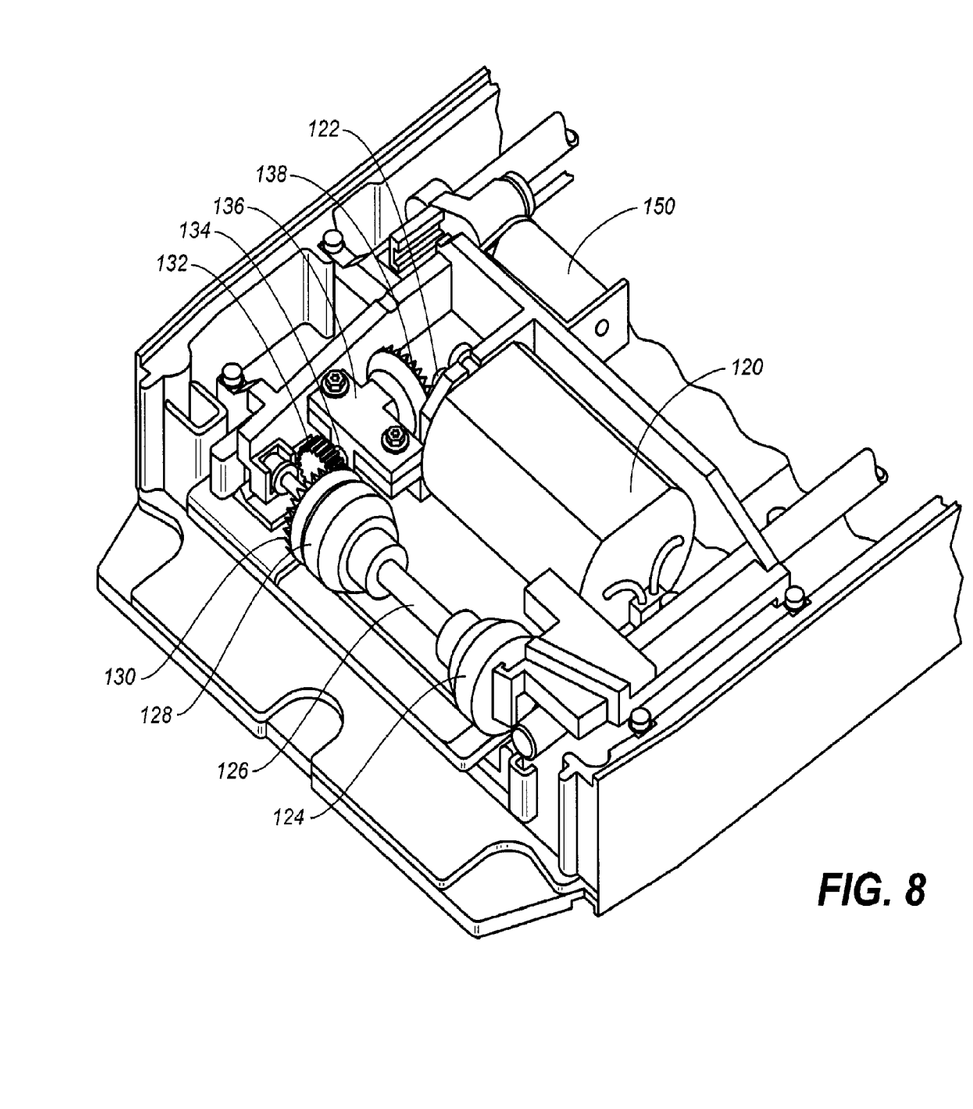
FIG. 8 is a top perspective detail of the card loader mechanism.

With respect to FIG. 8, the card loader is illustrated. A motor 120 turns drive shaft 122 rotating gear 138. Gear 138 is mounted on mount 136. A shaft 134 links gear 138 to gear 132. Gear 132 meshes with gear 130. As the gear 130 is rotated this rotates shaft 126. Shaft 126 rotates rollers 124, 128. The optical card is squeezed between the shuttle and the rollers to pull the card onto or off of the shuttle when the rollers are driven. This occurs when the shuttle is positioned in the loaded dock as explained in FIG. 2.

Figure 9:
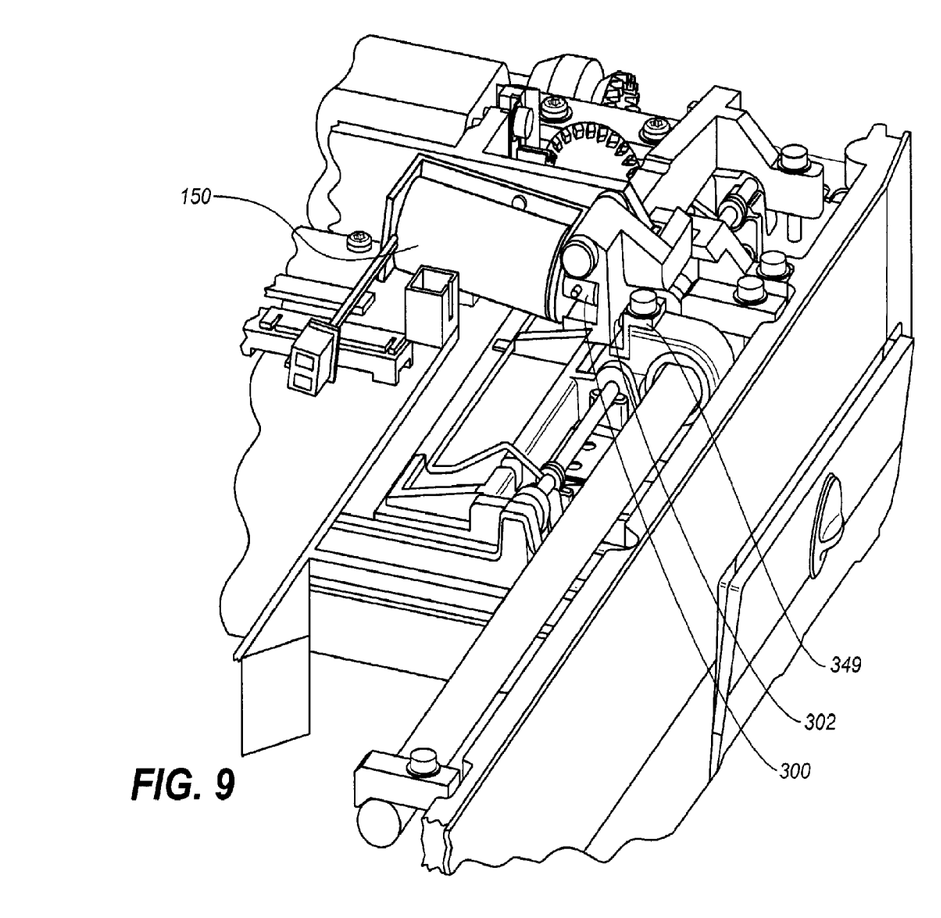
FIG. 9 is a top perspective detail of the shuttle lock mechanism.

FIG. 9 shows the shuttle lock mechanism. This keeps the shuttle in place when the rollers position a card onto the shuttle. A lock solenoid 150 is energized when the shuttle is moved to or from the load position. This disables the lock. The solenoid plunger 300 is connected to the lock pin 302 by linkage that eliminates the side forces on the plunger reducing the force requirements. Lock pin 302 engages lock engagement 349 located on the shuttle. This prevents the shuttle from moving to or from the load position. Alignment during assembly minimizes plunger travel requirements and also minimizes the force (maximum solenoid current) required to de-activate the lock mechanism.

Figure 10:
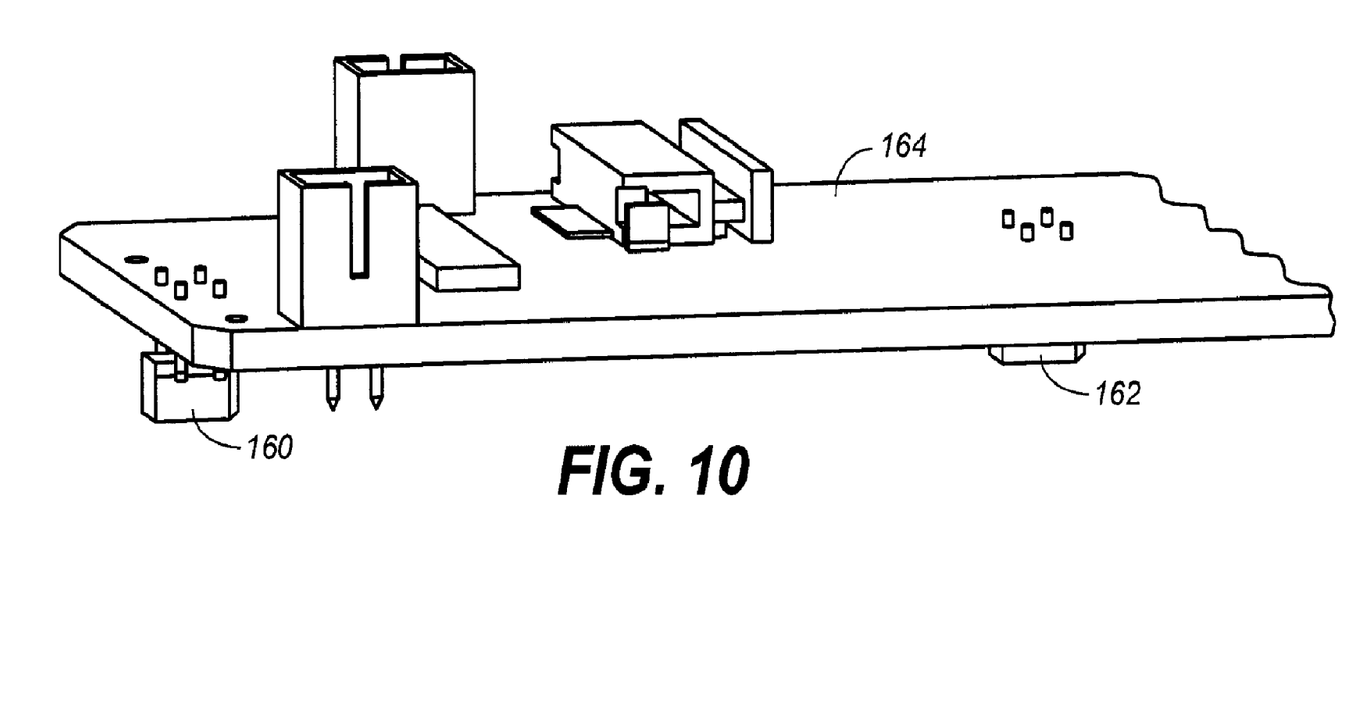
FIG. 10 is a side perspective detail of card position sensors.

FIG. 10 shows the location of two card proximity sensors 160, 162 mounted on the top cover circuit board 164. Sensors 160, 162 are positioned in a defined relation to a card in the load position. The output signal from sensors 160, 162 are used by the card loader/ejector controller to control roller activation. These sensors may be an appropriate non-contact device able to detect the positioning of the optical card.

Figure 11:
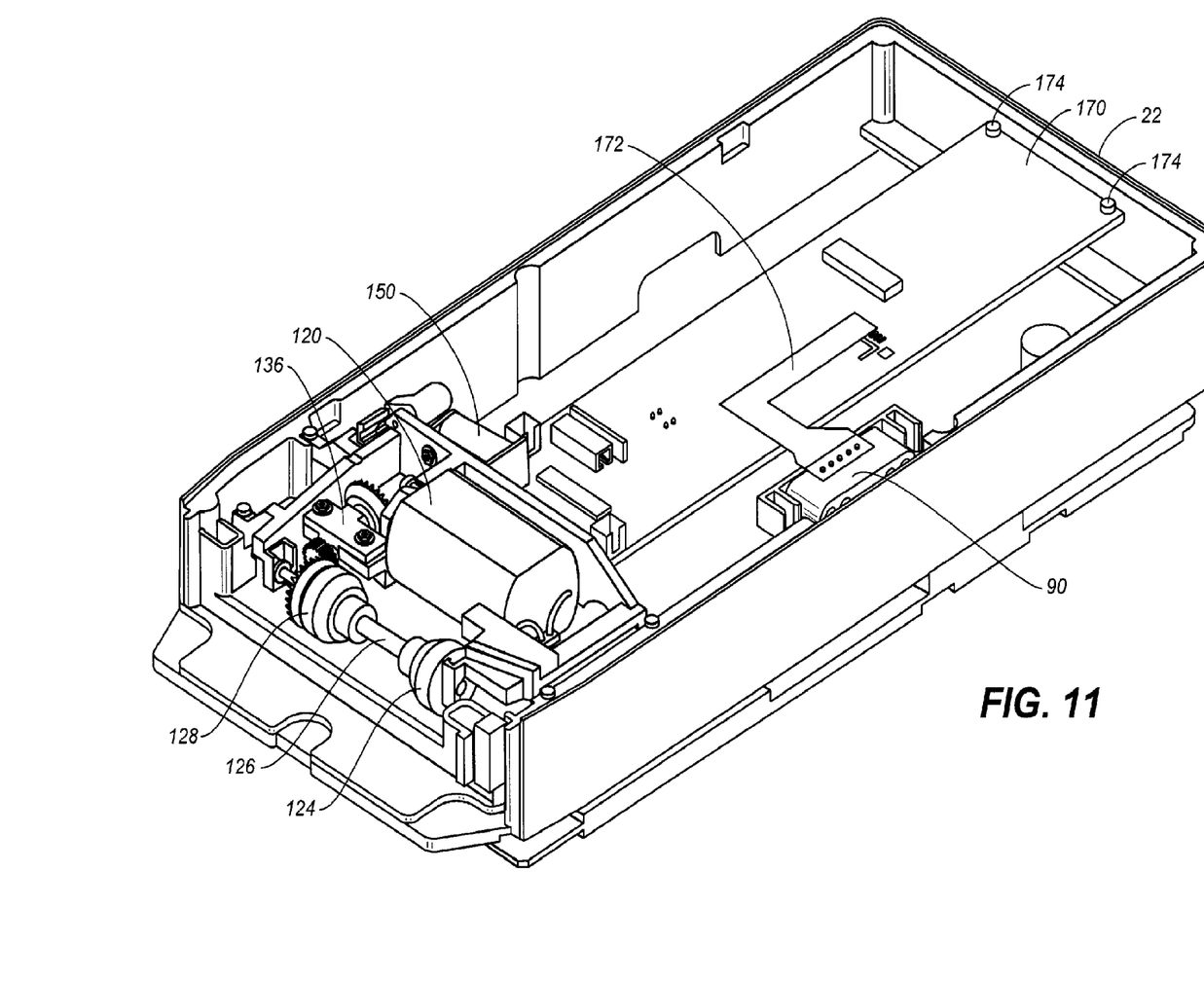
FIG. 11 is a top perspective view of the system showing the reader circuit boards.

With reference to FIG. 11, the top view shows two circuit boards of the reader. The circuit board 170 is secured to housing 22 by screws 174. The circuit board 170 interfaces to the control panel on the top cover. Circuit board 170 also has additional area available to accommodate electronics to control additional added operator control and displays built into the top cover of the reader. Connector 172 connects the circuit board to the shuttle position sensor 90.

Reader operation is controlled by a digital signal processor (DSP). The processor firmware has an architecture designed as a number of state machines running essentially simultaneously. When a track is being read, the processors perform a number of major operations. These include control of the digital focus servo, control of the digital tracking servo, control of the head objective position to center it on the track, control of the shuttle sweep operation, and receiving corrected read data from a programmable logic device such as a field programmable gate array (FPGA). The FPGA may be on the main circuit board. Further the processor also may transmit the read data to the host.

While a seek operation is being performed to move the optical head to a specified track on the optical card, the processor performs a number of functions. This includes control of the digital focus servo, issuing step commands to the stepper motor for velocity motion, conducting a short seek track-to-track move by pulsing the tracking actuator coil to accelerate and decelerate the lens to move on one track, interrogating the positioning track crossing counter state machine in the FPGA to determine when the target has been reached, interrogating the track crossing counter state machine once the target track is reached and turning the tracking servo at a tracking error zero crossing to capture the target track and issuing step commands to center the head tracking actuator.

Figure 12A:
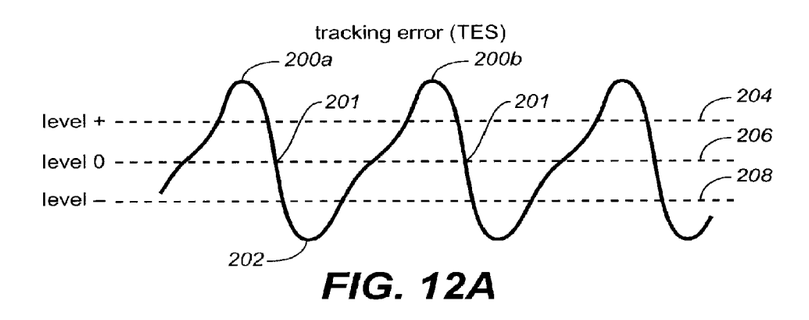
FIG. 12A is an analog tracking error graph.

With respect to FIG. 12A, an exemplary tracking error plot illustrates the use of the state machines in the controller to center an illumination beam on target spots. As was shown in FIG. 7B, on the present data card the optical data spots 7 are positioned between two parallel tracking strips 6, 19 which are equally spaced from the optical data spots 7. The optical head of the reader is angled such that the three beam spots 5, 8, 9 are positioned on the first tracking strip, the targeted data spots and the second tracking strips respectively. Beam spots 5 and 9 are positioned to read respective edges of the first and second tracking strips. Positioning these beam spots on these two tracking strips centers spot 8 on the optical data spots 7.

Figure 12B:
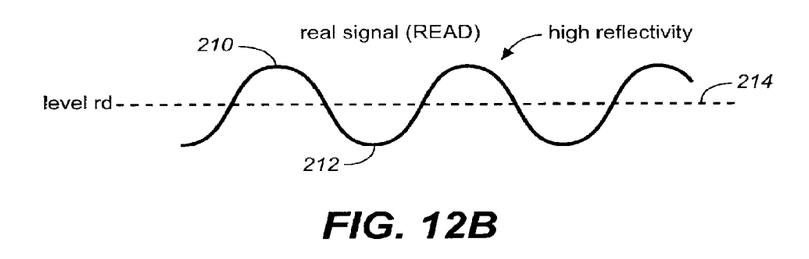
FIG. 12B is an analog read signal graph.

FIG. 12A shows an exemplary tracking error signal (TES) when the read beams are swept across tracks at a substantially constant velocity. Level − (208), level 0 (206), and level + (204) thresholds are illustrated. As seen in FIG. 12B, the read signal (READ) generated from the center beam varies from high reflectivity at peaks 210 to low reflectivity at bottom 212 above and below a read level 214. The track seek occurs at the ends of the card where there is no recorded data, a region of the track guides separated by higher reflectance media. As noted the read beam includes multiple beams. When the center beam crosses a track guide the read signal registers a dip 212 in amplitude as shown in FIG. 12B. The track centers are defined at the locations where the TES signal has a zero level 206 and the read signal is at a high reflectance 210. This corresponds to location 201 in FIG. 12A.

Figure 12C:
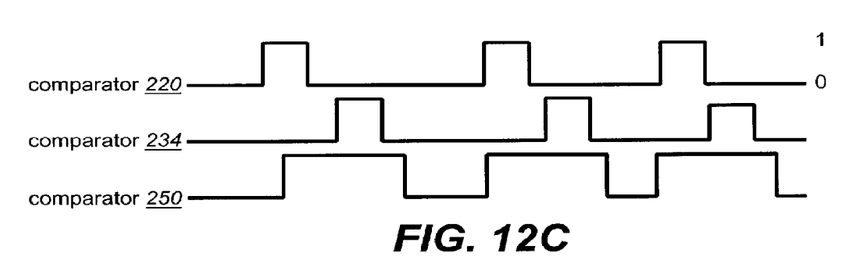
FIG. 12C is a digital comparator output graph.
Figure 12D:
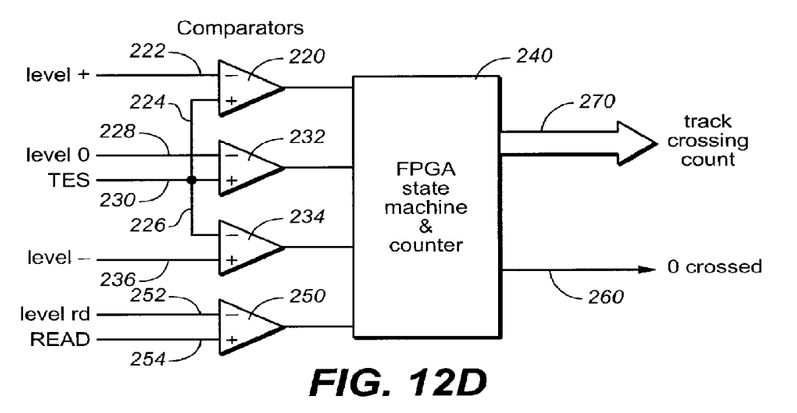
FIG. 12D is a circuit diagram of a track crossing counter state machine.

A simple circuit diagram shown in FIG. 12D illustrates an exemplary circuit configuration for the track counting. As the beam is scanned across the tracks, comparators 220, 232, 234, and 250, are relaying a signal to the field programmable gate array (FPGA) state machine and counter 240. Comparators 220, 232, and 234 receive input signals which include the tracking error signal (TES) and the level (+), level 0, and level (−) signals. The TES is supplied to the positive inputs 224 and 230 of comparators 220 and 232 and to the negative input 226 of comparator 234. The level (+) signal is supplied to the negative input 222 of comparator 220, the level 0 signal is supplied to the negative input 228 of comparator 232, and the level (−) signal is supplied to the positive input 236 of comparator 234. Thus, the output of comparator 220 represents whether or not the tracking error signal (TES) is greater than level (+). The output of comparator 232 represents whether or not the tracking error signal (TES) is greater than level 0. And, the output of comparator 234 represents whether or not the tracking error signal (TES) is less than level (−). Finally, a fourth comparator 250 compares the read signal (READ) 254 (shown as line 214 in FIG. 12B) to the read level threshold, level rd, supplied on input 252. The results of all of these comparisons are provided to the FPGA state machine 240. The state machine functions as illustrated in FIG. 12C. The track crossing count is one output 270 and the 0 cross count is a second state machine output 260.

FIG. 12C shows a method for counting track crossings when the beams are swept across the tracks. When the center beam moves from a track center position to the adjacent track center position on the left (as illustrated in the various figures of FIG. 12) the track counter is incremented by one. When moving to the right the track counter is decremented. The counter control signals are generated by a state machine 240 as shown in FIG. 12D which takes three of the four comparator signals 220, 234, and 250, as inputs. FIG. 12C shows the three comparator outputs corresponding to the weigh forms of FIGS. 12A and 12B.

Figure 13:
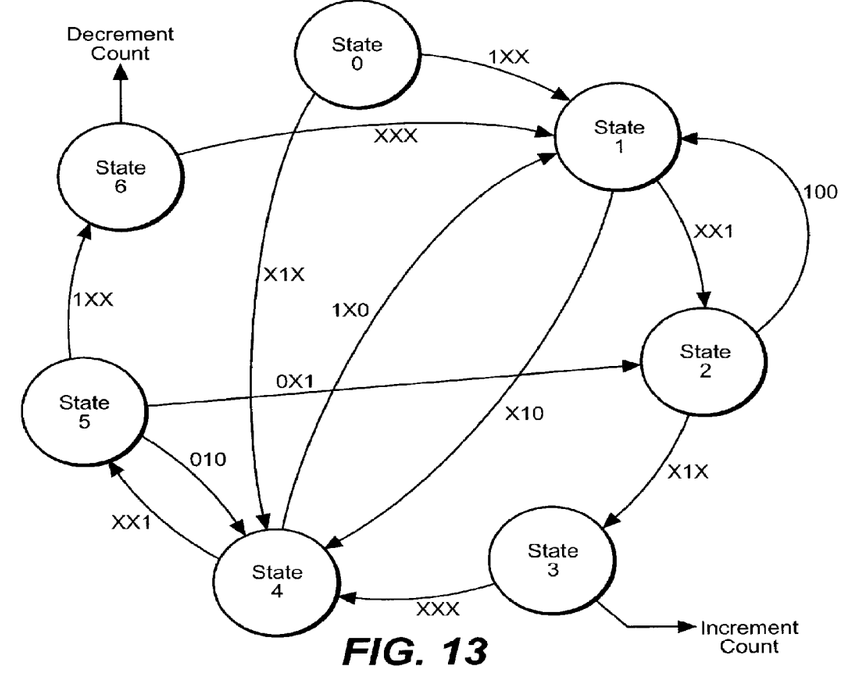
FIG. 13 is a circuit diagram of the comparators and state machine used by the system controller.

With reference to FIG. 13, a state machine can be described as a finite collection of states with transition rules that govern the transition between states. A state vector will be used to describe the transition roles. The vector is created from the comparator outputs 220, 234, and 235 of FIG. 12C as follows:
State vector=<comparator 220><comparator 234><comparator 250>

For example, state vector 101 in FIG. 13 indicates a position where comparators 220 and 250 have high outputs (1) and comparator 234 is low (0), state vector 0XX indicates that comparator 220 is low and the other comparator outputs are ignored (don't care). In the diagram of the state machine implementing this track crossing counter is depicted in FIG. 13 each bubble is a state and each arrow represents a change of state governed by the state vector. The counters employed during a track seek operation where the seek starts at track center. The control executes a sweep operation and monitors the state machines track counter. When the desired count has been achieved, the controller switches to a track settle algorithm. A track sweep is performed (shuttle motion) and the track address is read from the card to determine what track the beams are actually on.

State 0 is track center and the state vector is 001 in this position. Note that many of the states associated with the branches have "X" (i.e., don't care) elements. The vectors are defined to ensure that there is no ambiguity for multiple branch cases. If none of the branching roles are satisfied the machine remains in its current state. Note that the state machine never returns to state 0 during a seek operation. This is because the settling method does not employ the state machine.

When moving at a uniform velocity in the counting increment direction state sequence is 1-2-3-4-1-2 . . . . This sequence continues to repeat as tracks are crossed and counted. In the reverse direction when moving at a uniform velocity in the counting decrement direction the state sequence is 4-5-6-1-4-5 . . . in a repeating pattern. As shown in the below diagram other branches are present because the seek motion is usually oscillatory thus the state machine must detect reversals of direction.

This state machine generates instantaneous signal track count from the read and tracking signals that is available to the DSP. This allows rapid positioning of the optical head (shown in FIG. 6) on the selected optical track on the card.

A person of skill in the art will realize that a number of substitutions, alterations, modifications and reconfigurations are possible with the present device while still remaining within the scope of the present invention. For example, the illustrated card loader provides one convenient means for loading the card onto the shuttle. However, the card could also be manually loaded if the shuttle extended from the housing. The position sensor of the cards are also exemplary, but a number of alternative means for determining the position of the card and/or the shuttle using optical, mechanical, or electronic sensors are available.

The invention could be characterized in a number of ways. One embodiment of the improvement is simply taking a known three beam CD optical read head and altering the positional configuration of the CD read head in relation to the optical media on the card being read such that two of the three beams target the tracking strips and a single central beam is focused on the optical media. This was achieved in one embodiment by rotating the CD read head 18.5 degrees from its normal orientation. This provides a simple means for ensuring proper targeting of the optical data on the card. Further, the use of a consumerized CD optical read head is enabled by modifying the lens to reduce the numerical aperture (NA). This reduces the aberrations read by the system. Surface printing on the lens is one means of effecting the needed reduction. Alternatively, a mask or filter could be used, a stop or aperture could be positioned to block some of the light, or other means to reduce the NA.

This invention could also be characterized as the development of a portable system for reading optical cards. This is in part developed by replacing the shuttle linear motor with a more cost effective, portable and low power DC motor. In addition, the optical head linear motor of prior system has been replaced with a more cost effective, portable and low power stepper motor-lead screw combination.

The invention could also be characterized as the use of a system for reading an optical card in which the card is read from below. This allows the optical read head access to the entire area of recorded optical media without contracting the shuttle card clamp mechanism.

This portable card reader may have a USB and Bluetooth interface for transmission of data to a personal computer. The position scale may provide signed velocity, absolute position, or other information.

What is claimed is:

1. A reader for reading optical cards having optical data tracks flanked on two sides by tracking strips, said reader having a shuttle for holding said optical card and a motor linked to said shuttle such that the optical card can be moved on a shuttle axis, the improvement comprising:
   a CD read head oriented at a CD read head angle such that three illumination beam spots produced by said CD read head are targeted onto a first tracking strip, a targeted optical data track, and a second tracking strip respectively, wherein said CD read head angle is at a different angle than perpendicular to said shuttle axis.

2. The reader of claim 1, wherein said CD read head angle is 18.5 degrees.

3. The reader of claim 1, wherein said CD read head is driven by a stepper motor driving a lead screw.

4. The reader of claim 1, wherein said CD read head transmits data to a controller, said controller including a plurality of simultaneously running state machines.

5. The reader of claim 4, wherein said controller generates a track count from a read and a tracking error signal.

6. The reader of claim 1, wherein said CD read head further comprises an objective lens configured to correct for an aberration produced during reading of optical cards.

7. The reader of claim 1, wherein said CD read head further comprises an objective lens with an angular ring mounted on an exposed surface of said objective lens.

8. The reader of claim 1, wherein said CD read head further comprises an objective lens with numerical aperture of approximately 0.32.

9. The reader of claim 1, wherein said beam spots provide a tracking signal.

10. The reader of claim 9, wherein said CD read head further comprises an objective lens with numerical aperture of approximately 0.32, said objective lens configured to correct for an aberration produced during reading of optical cards and comprising an angular ring mounted on an exposed surface.

* * * * *